United States Patent [19]
Biette

[11] Patent Number: 5,490,549
[45] Date of Patent: Feb. 13, 1996

[54] FENDER AND FUEL TANK COVERS FOR A MOTORCYCLE

[75] Inventor: Douglas A. Biette, Moose Jaw, Canada

[73] Assignee: 607541 Saskatchewan Inc., Moose Jaw, Canada

[21] Appl. No.: 265,060

[22] Filed: Jun. 29, 1994

[51] Int. Cl.$^6$ ..................................... B65D 65/04
[52] U.S. Cl. ............................ 150/167; 296/78.1
[58] Field of Search ..................... 150/167, 166, 150/154; 296/136, 78.1; 220/770; 118/505

[56] References Cited

U.S. PATENT DOCUMENTS

| | | | |
|---|---|---|---|
| 3,298,712 | 1/1967 | Greenstadt | 280/770 |
| 3,659,872 | 5/1972 | Warner | 296/78.1 |
| 4,114,633 | 9/1978 | Herbez | 150/167 X |
| 4,171,145 | 10/1979 | Pearson, Sr. | 150/167 X |
| 4,283,084 | 8/1981 | Gallagher | 296/78.1 |
| 4,960,302 | 10/1990 | Walters | 296/78.1 X |

FOREIGN PATENT DOCUMENTS 1013537  8/1957  Germany ......................... 296/78.1

OTHER PUBLICATIONS

Original of p. 71 from a "Jammer Ordering Catalogue" disclosing an All-Weather Fat Bob Tank Bra.
Original of a page from a "Jammer Ordering Catalogue" disclosing an engine stand for a motorcyle engine.
Original of *Hot Rod Harleys* "Special Magazine Issue" disclosing an engine stand for a motorcycle. The stand is illustrated at pp. 44, 45, 48, 49, 53, 58 and 59.

Primary Examiner—Allan N. Shoap
Assistant Examiner—Christopher J. McDonald
Attorney, Agent, or Firm—John R. Uren

[57] ABSTRACT

A fuel tank cover to temporarily cover the top and sides of the fuel tank of a motorcycle. The fuel tank cover has an upper panel that is solid and intended to cover the entire upper portion of the fuel tank. Two side panels are adapted to snugly cover the sides of the fuel tank and a forward panel member is adapted to cover the forward portion of the fuel tank.

4 Claims, 5 Drawing Sheets

FENDER AND FUEL TANK COVERS FOR A MOTORCYCLE

INTRODUCTION

This invention relates to fuel tank and fender covers and, more particularly, to fuel tank and fender covers used for motorcycle repair and maintenance.

BACKGROUND OF THE INVENTION

It is known in the automobile industry to provide a vinyl cover which may be draped over a fender or fenders beside the engine compartment as mechanical work is being performed on the engine within the compartment. The purpose of the fender cover is to protect the finish of the fenders from scratches and the like which can be caused by the mechanic working on the engine or by the tools which are being used in the maintenance or repair work.

Likewise and also in the automotive industry, "bras" have been designed for mounting on the forward portion of the automobile while the automobile is in operation. These bras are primarily used to protect the finish of the car from bugs and other road debris which could otherwise chip the paint and cause damage on the forward parts of the car. Bras are also used on automobiles for appearance purposes, the thought being that such bras provide a more "racy" image to the car on which they are installed.

On motorcycles, bras have likewise been used on the fuel tanks of the motorcycle which tanks are generally located between the legs and forwardly of the rider of the motorcycle. These bras are also designed to protect the finish of the fuel tank and create a "racy" image. They have a large recess to allow access to the opening of the fuel tank and to allow visibility for the speedometer, tachometer or other instrumentation which may be installed in the top of the fuel tank. Such bras are intended to be used when the motorcycle is in operation and are generally somewhat permanently installed and are not easily removed. They do not protect the finish of the entire fuel tank with its tank lid and instrumentation.

SUMMARY OF THE INVENTION

According to one aspect of the invention, there is provided a fuel tank cover to temporarily cover the top, front and sides of the fuel tank of a motorcycle, said fuel tank cover having an upper panel, a forward panel and two side panels, said panels being formed so as to assume a shape corresponding to the fuel tank on which said cover is to be temporarily installed, said upper panel of said fuel tank cover being solid in the area of the upper portion of said fuel tank.

According to a further aspect of the invention, there is provided an engine stand comprising an upper arm adapted to securely hold an engine, said upper arm being adapted to rotate about a first axis and relative to a lower arm, said lower arm being adapted to rotate about an axis substantially transverse to said first axis of rotation of said upper arm, a first retainer to maintain said upper arm in a predetermined one of a plurality of positions, and a second retainer to release and maintain said lower arm in one of a plurality of desired positions.

BRIEF DESCRIPTION OF THE SEVERAL VIEWS OF THE DRAWINGS

Specific embodiments of the invention will now be described, by way of example only, with reference to the accompanying drawings in which.

DESCRIPTION OF SPECIFIC EMBODIMENT

Figure 1:
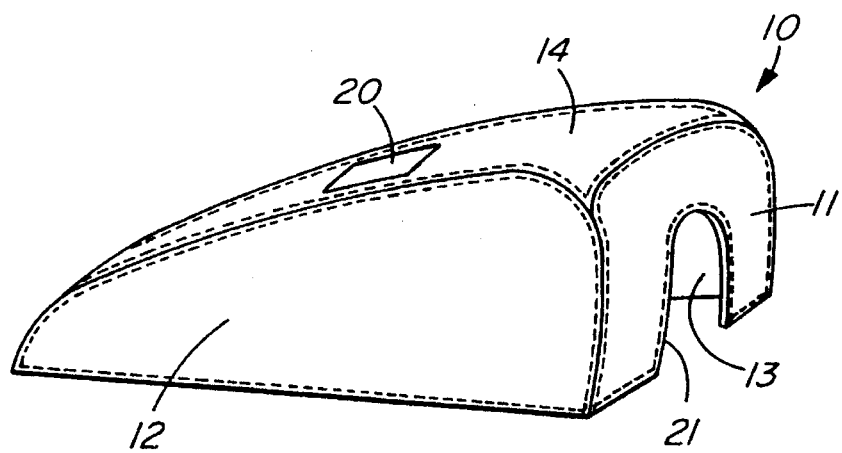
FIG. 1 is a diagrammatic isometric view of a fuel tank cover according to the invention which is used for a relatively large motorcycle fuel tank.

Referring now to the drawings, and with reference to FIG. 1, a fuel tank cover, namely a fuel tank cover used for a large fuel tank and particularly for fuel tanks used on Harley Davidson motorcycles, is generally shown at 10. The tank cover 10 has four panel members, namely front panel member 11, side panel members 12, 13 and upper panel member 14. The four panel members 10, 11, 12, 13 are adapted to be stitched or fastened together and to snugly fit the fuel tank (not shown) the panel members 10, 11, 12, 13 forming the tank cover 10 are intended to cover. A material that is tough and thick yet pliable, such as vinyl or leather, is preferred for the outside surface. A soft inner shell such as cotton or flannel is appropriate to avoid scratching the finish of the fuel tank when the cover 10 is in its installed position.

In the upper panel member of the tank cover 10, a pouch 20 is provided to hold work orders or the like such as tools, screws or bolts while the repair on the motorcycle is being performed. A recess 21 is provided in the forward panel 11 which is adapted to allow the motorcycle frame (not shown) which extends from the forward portion of the motorcycle to the rearward portion to pass through the fuel tank.

Figure 2:
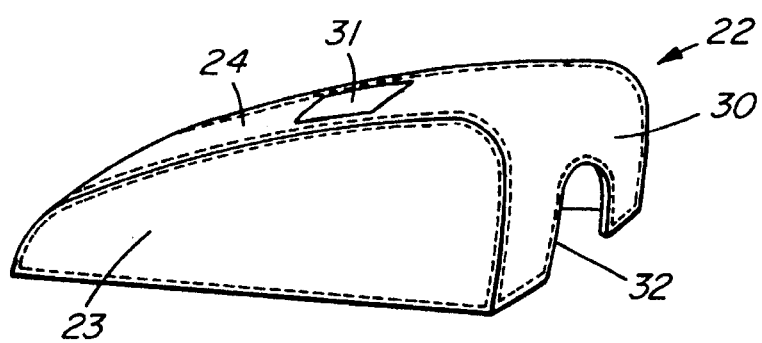
FIG. 2 is a diagrammatic isometric view of a fuel tank cover according to the invention which is used for a relatively smaller motorcycle fuel tank.

With reference to FIG. 2, a smaller tank cover is generally illustrated at 22. The tank cover 22 is adapted to fit over smaller fuel tanks and comprises, again, two side panels 23 (only one of which is shown), and a single upper panel member 24 which also includes the forward panel member 30. Upper panel member 24 again and conveniently has a pouch 31 formed therein which is adapted to hold work orders, tools and the like which may be used during motorcycle repair. In the same manner as in connection with the FIG. 1 embodiment, a recess 32 is formed in the forward panel member 30 in order to allow passage of the motorcycle frame extending from the forward portion of the motorcycle to the rearward portion.

Figure 3:
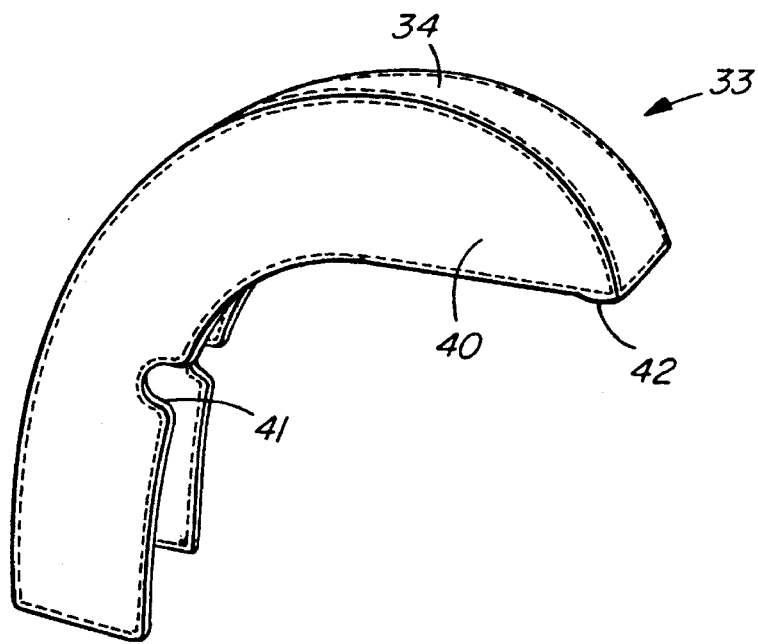
FIG. 3 is a diagrammatic isometric view of a fender cover according to a further aspect of the invention which is intended to be temporarily installed over the forward fender of a motorcycle.

A front fender cover according to the invention is generally shown at 33 in FIG. 3. Fender cover 33 includes an upper panel member 34 and two side panel members 40, only one of which is shown. The side panel members 40 are stitched to the upper panel member 34 and are intended to be made from the same material as are the tank covers 10, 22. A cut-out 41 is provided so that the brake or speedometer cables of the motorcycle do not interfere with the installation of the fender cover 33. A lip 42 is conveniently formed on the forward portion of the upper panel member 34, which lip 42 is intended to fit over the tip of the fender on which the fender cover 33 is installed to hold.

OPERATION

In operation, the appropriate one of the tank covers 10, 22 is selected according to the size of the fuel tank on which the tank cover is intended to be installed. It will be assumed that tank cover 10 is selected.

The tank cover 10 is simply positioned temporarily over the fuel tank on the motorcycle on which it is intended to perform repair or maintenance work. The tank cover 10 is intended to snugly and completely enclose the fuel tank and is intended to remain in place during the repair and maintenance work. In the event that the mechanic desires to rest his tools or temporarily rest bolts and the like, he may use the pouch 20 for this purpose. Alternatively, work orders may be placed in the pouch 20.

When the maintenance or repair work is completed and there is no apprehension that the fuel tank may be damaged by tools, dropped bolts and the like, the fuel tank cover 10 is removed and stored for use on another motorcycle. It is specifically intended that the tank covers 10, 22 according to the present invention are to be used for Harley Davidson type motorcycles. However, it clearly would not be difficult to adapt the tank covers for use on other makes of motorcycles as well.

With reference to FIG. 2, tank cover 22 is installed utilizing the same procedure as is used with the tank cover 10 of FIG. 1. The pouch 31 is used for the same purpose and the recess 32 will be of a size that will be appropriate for the fuel tank of the particular motorcycle on which it is intended to install tank cover 22. Tank cover 22 is likewise adapted to be easily and quickly removed when the repair and maintenance work is done and to be reusable, of course, on subsequent motorcycles.

With reference to FIG. 3, the fender cover 33 fits between the forks of the motorcycle which hold the forward wheel to cover the fender over the motorcycle wheel. When the fender cover 33 is installed over the front fender (not shown) the lip 42 provides a retaining action which tends to maintain the fender cover 33 on the front fender during the repair and maintenance work. Cut-out 41 is provided for cables which may extend from the front wheel of the motorcycle to the speedometer or brake so that the installation of the fender cover is not affected by these cables. Again, when the repair work is completed, the fender cover is simply removed from the front fender and stored for reuse.

Figure 4:
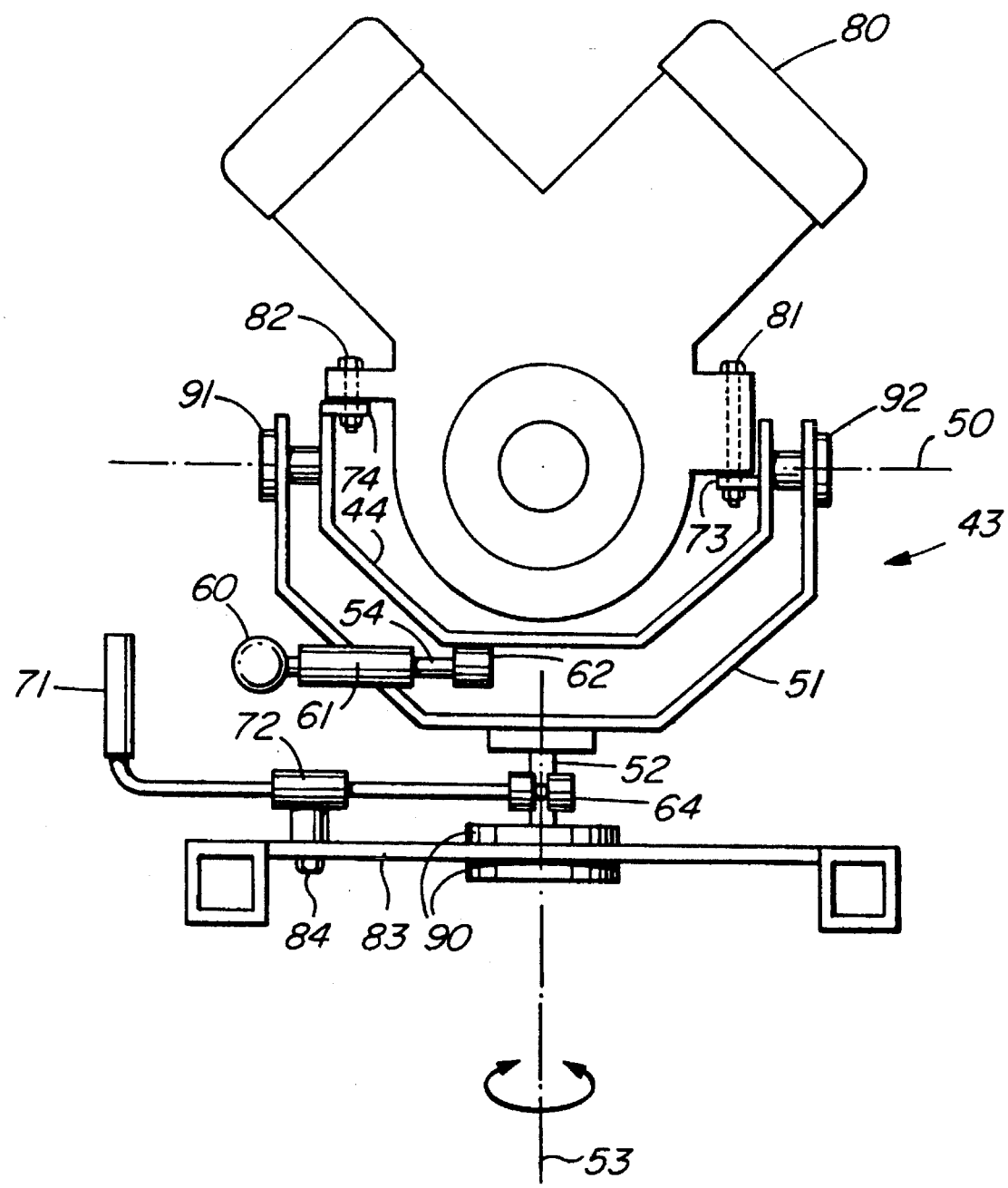
FIG. 4 is a diagrammatic view of an engine stand taken form the front which is used to support a motorcycle engine according to the invention.

A further embodiment of the invention is an engine stand generally illustrated at 43 in FIG. 4. Engine stand 43 has an upper arm 44 which tilts about an axis 50 at approximately 45° on either side of the center line of axis 50. Axis 50 extends through sealed bearings 91, 92. A lower arm 51 is provided which is attached to a shaft 52 which shaft 52 is rotatable about axis 53 in either direction within double bearing 90 as is indicated by the arrow. A spring biased pin 54 is mounted on lower arm 51. A handle 60 is attached to one end of pin 54 and a spring (not shown) within housing 61 biases the pin 54 into one of the two pin holes 62, 63 (FIGS. 5A and 5B) provided on the lower arm 51. A collar 64 is provided on shaft 52 which collar 64 may be tightened or loosened by the action of arm 70 which is rotated by handle 71 within housing 72 which is attached to frame 83 by bolt 84. By rotating the handle 71 in a clockwise direction as viewed from the left hand side of FIG. 4, the collar 64 is tightened on shaft 52 thereby preventing rotation and holding the lower arm in a stationary position. By rotating handle 71 in a counterclockwise position as viewed from the left hand side in FIG. 4, the collar 64 is loosened on the shaft 52 with the result that shaft 52 is readily rotatable about axis 53.

Figure 5A:
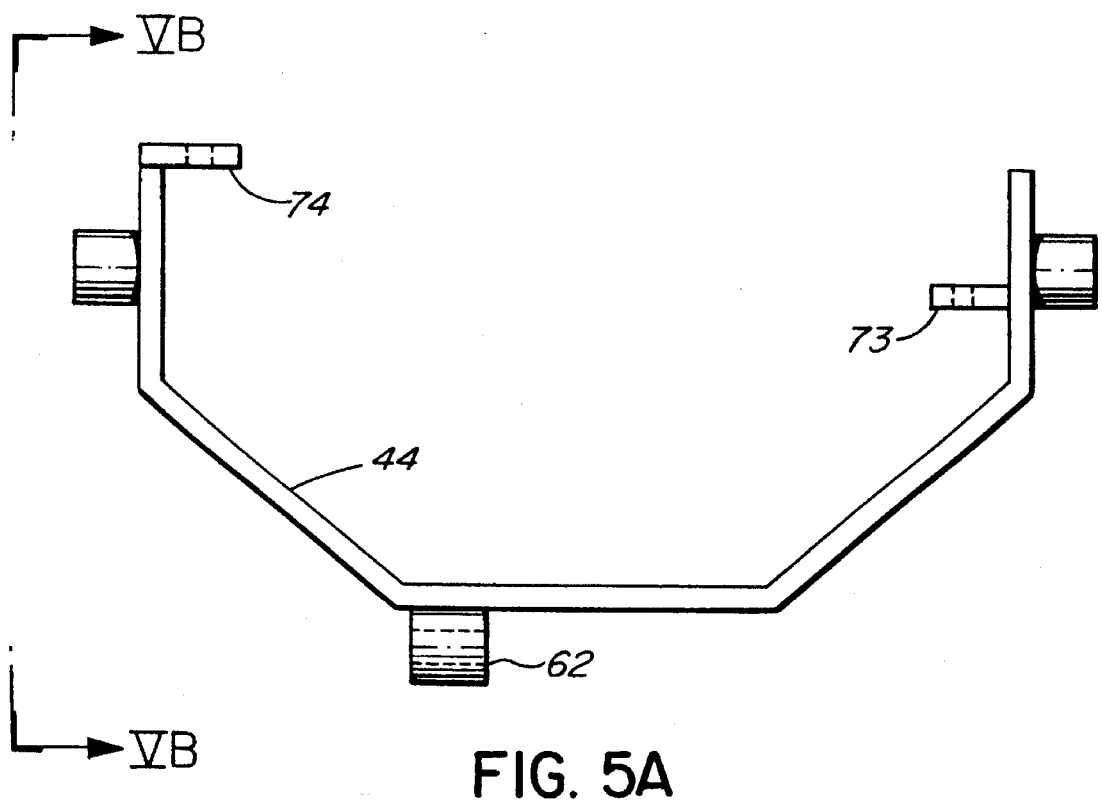
FIG. 5A is an enlarged view of the upper arm of the engine stand of FIG. 4.
Figure 5B:
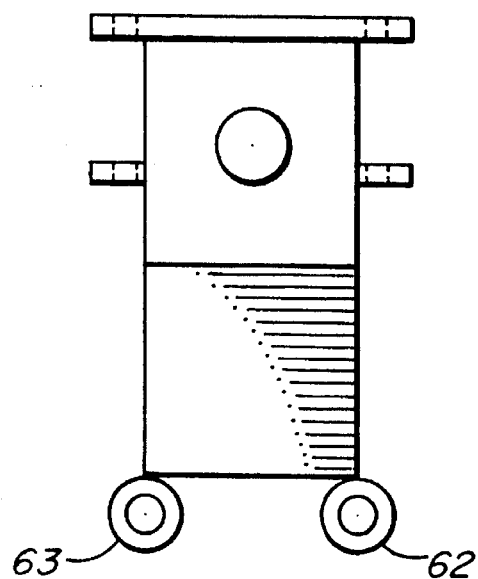
FIG. 5B is a view of the upper arm taken from the left of FIG. 5A along VB—VB.
Figure 6A:
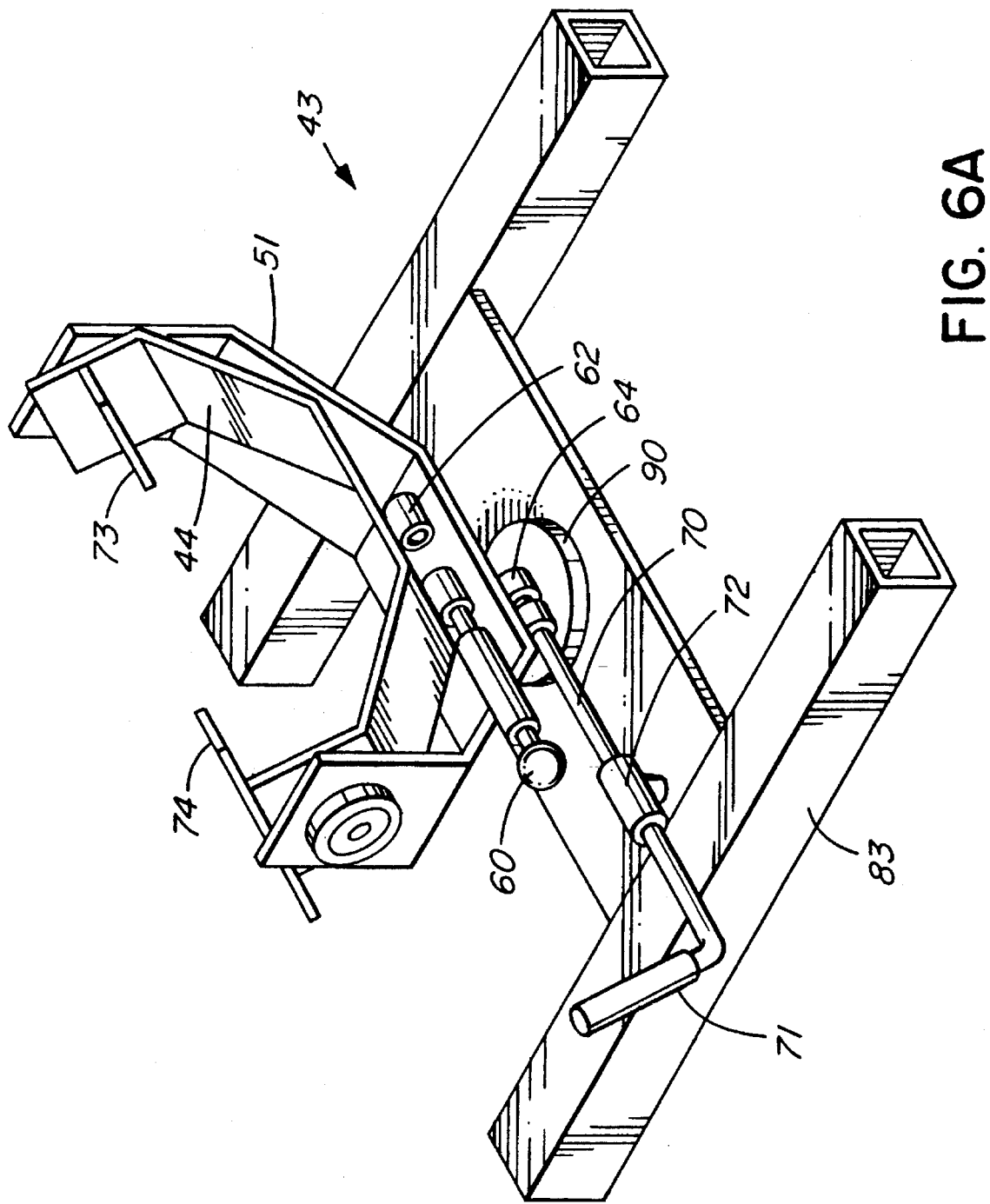
FIG. 6A is a diagrammatic isometric view of the engine stand of FIG. 4.
Figure 6B:
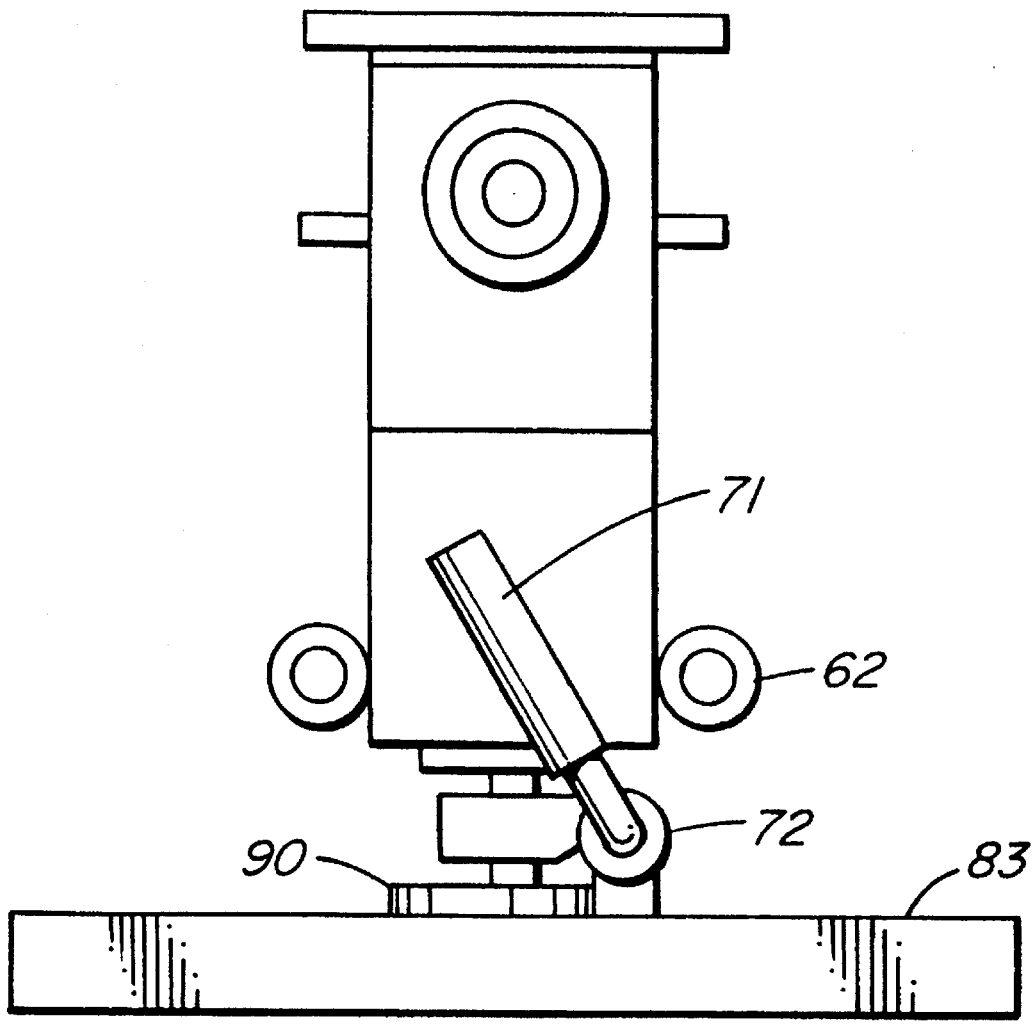
FIG. 6B is a view taken from the side and particularly illustrating the handle used with the stand.

Two arms 73, 74 extend inwardly from upper arm 44. As best seen in FIG. 5A, arms 73, 74 have bolt holes extending therethrough. The bolt holes are adapted to conveniently align themselves with corresponding bolt holes in the engine 80 for which the engine stand 43 is adapted to particularly fit.

In operation, engine 80 is mounted in the engine stand 43 and bolts 81, 82 are inserted into the engine through the bolt holes in arms 73, 74 thereby providing stability to the engine when it is mounted to the upper arm 44. Following the mounting of the engine in the engine stand 43, the mechanic may conveniently move the engine to the desired position for ease of access and convenience when working on the engine.

For example, if it is desired to rotate the engine about the axis 50, handle 60 is pulled by the operator which will remove pin 54 from one of the pin holes 62, 63, into which the pin extends prior to pulling the handle 60 outward. Thereafter, upper arm 44 is conveniently rotated about axis 50 until the opposite pin hole is reached whereby handle 60 is released and the pin 54 enters the other one of the pin holes 62, 63.

If it is desired to rotate the engine in the engine stand 43, handle 71 is moved counterclockwise to loosen collar 64 on shaft 52 and, thereafter, the engine may be rotated with the upper arm 44 and lower arm 51 being rotated about axis 53 until the desired rotation location is reached. Thereafter, handle 61 is rotated in a clockwise direction until collar 64 is tightened on shaft 52 whereby the engine is held in its desired position for maintenance or repair work as the operator may desire. When the repair work is completed, the engine is removed from the engine stand 43.

The fuel tank and fender covers 10, 22, 33, as well as the engine stand 43, are all adapted particularly for Harley Davidson motorcycles but, of course, they could conveniently be designed for other motorcycles as well. In respect of the engine stand 43, all that would need to be done would be to ensure that the size of the engine stand was appropriate for the engine on which it is intended to work and that the bolt holes in the arms 73, 74 are appropriately located so that the engine may be securely attached to the upper arm 44 during operation.

While it is specified that the fuel tank and fender covers are made from panel members as in a fabric, it is also contemplated that the covers could be molded from a plastic-like material which mold simply fits over the fuel tank and fender and which could be subsequently easily removed.

While specific embodiments of the invention have been described, such embodiments are given by way of example only and not as limiting the scope of the invention which should be construed in accordance with the accompanying claims.

What is claimed is:

1. A cover for a gas tank of a motorcycle comprising:

two opposed side panels, each having a bottom edge having a first and second end, a front edge extending upward from the bottom edge first end which joins a substantially arcuate top edge extending from the bottom edge second end to the front edge, a first panel portion extending between the top edges of the side panels substantially along their entire length, the first panel portion being contiguous along its entire extent, a second panel portion extending between the front edges of the side panels along substantially their entire length, the cover having an open bottom to allow the cover to be placed on a motorcycle gas tank.

2. A fuel tank cover as in claim 1 and further comprising a recess in the forward panel member, said recess extending through the forward panel member to allow access for a crossbar of the motorcycle on which the tank cover is installed.

3. A tank cover as in claim 2 and further comprising a pouch on the upper panel member of said fuel tank cover.

4. A fuel tank cover as in claim 3 wherein said upper, front and side panel members are individual panel members which are attached together.

\* \* \* \* \*